US008653695B2

(12) United States Patent
Chang et al.

(10) Patent No.: US 8,653,695 B2
(45) Date of Patent: Feb. 18, 2014

(54) POWER SWITCHING DEVICE AND METHOD THEREOF, AND PROJECTION DEVICE USING THE POWER SWITCHING DEVICE

(75) Inventors: Yi-Shun Chang, Hsin-Chu (TW); Mao-An Wang, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 793 days.

(21) Appl. No.: 12/907,018

(22) Filed: Oct. 18, 2010

(65) Prior Publication Data
US 2011/0127840 A1    Jun. 2, 2011

(30) Foreign Application Priority Data
Nov. 30, 2009   (CN) .......................... 2009 1 0225846

(51) Int. Cl.
*H02J 1/00*    (2006.01)
(52) U.S. Cl.
USPC .................................. 307/80; 307/85; 307/86
(58) Field of Classification Search
USPC ................................................. 307/80, 85, 86
See application file for complete search history.

(56) References Cited

U.S. PATENT DOCUMENTS

| 4,788,450 | A | 11/1988 | Wagner |
| 6,285,091 | B1 | 9/2001 | Chan et al. |
| 7,709,976 | B2 * | 5/2010 | Bazinet ........................... 307/85 |
| 2008/0197707 | A1 * | 8/2008 | Chi Yang ........................ 307/71 |

* cited by examiner

*Primary Examiner* — Rexford Barnie
*Assistant Examiner* — Dru Parries
(74) *Attorney, Agent, or Firm* — Jianq Chyun IP Office (57) ABSTRACT

A power switching device, a power switching method, and a projection device using the power switching device are provided. In the power switching method, a first power and a second power are received, and the voltage level of the first power is compared with the voltage level of the second power. One of the first power and the second power having the higher voltage level is sustained by using one of the first power and the second power having the lower voltage level until one of the first power and the second power having the higher voltage level stabilizes. At least one of the first power and the second power having the higher voltage level and being already stabilized is output as an output voltage.

24 Claims, 6 Drawing Sheets

POWER SWITCHING DEVICE AND METHOD THEREOF, AND PROJECTION DEVICE USING THE POWER SWITCHING DEVICE

CROSS-REFERENCE TO RELATED APPLICATION

This application claims the priority benefit of China application serial no. 200910225846.4, filed on Nov. 30, 2009. The entirety of the above-mentioned patent application is hereby incorporated by reference herein and made a part of this specification.

BACKGROUND OF THE INVENTION

1. Field of the Invention

The invention relates to a power switching technique, and more particularly, to a power switching device and a method thereof and a projection device using the power switching device.

2. Description of Related Art

A projector projects an image onto a large screen so that the image may be viewed by more people. Thus, projectors are often used in companies and schools. However, with the increasing display size of home display product, the projection device has been gradually adopted at home and become a popular electronic product in our daily life.

The design of all electronic products is going toward high speed, high performance, small volume, and light weight. As a result, the pico projector (or mini projector) has gradually become the mainstream in the market of personal digital products. Generally speaking, a pico projector adopts the light emitting diode (LED) or other solid state light sources as its light source in order to achieve an increased luminance and accordingly an increased brightness of images projected by the pico projector.

The size of a rechargeable battery in a pico projector is approximately the same as an existing mobile phone, the pico projector itself is small and light, and therefore the pico projector may be carried around conveniently. Thus, the pico projector may be used almost everywhere. In addition, a pico projector with a rechargeable battery is expected to operate for several hours. If the pico projector is used for entertainment purpose, enough power is supplied by the rechargeable battery for meeting general purposes, such as playing a DVD movie of about 150 minutes. If the pico projector is used for business purpose, it may project images from 2 to 100 inches according to the requirement of the conference report.

In an actual application, when the rechargeable battery in a pico projector has insufficient power, a user needs to use an external power adapter to keep the pico projector working. Two conventional power switching devices have been provided to safely convert the direct current (DC) power supplied by a rechargeable battery into a DC power supplied by a power supplier so as to keep a pico projector operating properly.

Figure 1:
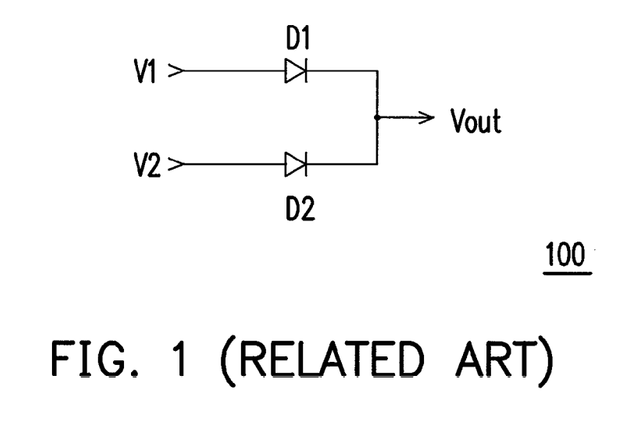
FIG. 1 is a diagram of a conventional power switching device.

FIG. 1 is a diagram of a conventional power switching device 100. Referring to FIG. 1, the power switching device 100 is composed of two diodes D1 and D2. The anode of the diode D1 and the anode of the diode D2 respectively receive the DC power V1 supplied by the rechargeable battery and the DC power V2 supplied by a power supplier, and the cathode of the diode D1 and the cathode of the diode D2 are coupled with each other to output at least one of the DC power V1 and the DC power V2 as an output voltage Vout. According to the operation principle of the power switching device 100, automatic power switching is accomplished based on the voltage levels of the DC power V1 and the DC power V2. However, when the load currents on the diode D1 and the diode D2 increase, the voltage drops (i.e., cut-in voltages) of the diode D1 and the diode D2, and accordingly losses produced on the DC power V1 and the DC power V2, are also increased.

Figure 2:
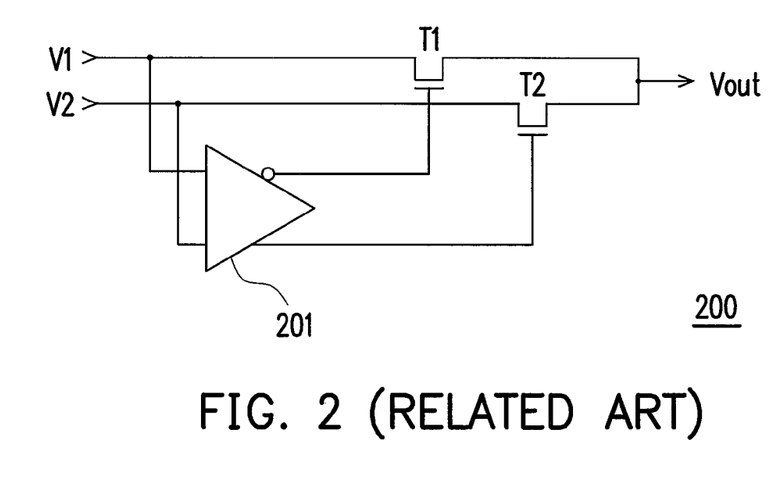
FIG. 2 is a diagram of another conventional power switching device.

FIG. 2 is a diagram of another conventional power switching device 200, wherein the power switching device 200 is disclosed in U.S. Pat. No. 6,285,091. Referring to FIG. 2, the power switching device 200 includes two transistors (or switches) T1 and T2 and a comparator 201. The comparator 201 receives the DC power V1 supplied by the rechargeable battery and the DC power V2 supplied by the power supplier and compares the voltage levels of the DC power V1 and the DC power V2, so as to turn on at least one of the transistors T1 and T2 and output at least one of the DC power V1 and the DC power V2 as the output voltage Vout. Because little loss is produced on the load currents passing through the transistors T1 and T2, aforementioned problem in the power switching device 100 may be effectively resolved in the power switching device 200.

However, if the power switching device 200 has a great load, a great voltage drop may be produced after the DC power V1 and the DC power V2 are switched, and accordingly a system power off, hang up or reset of a portable pico projector may be resulted. If the voltage levels of the DC power V1 and the DC power V2 are close to each other, the comparator 201 may even constantly switch the transistors T1 and T2 alternatively and the output voltage Vout may be reduced. Thus, the stability of the power supply is reduced. Besides, the U.S. Pat. No. 4,788,450 also discloses a power switching technique.

SUMMARY OF THE INVENTION

Accordingly, the invention is directed to a power switching device, and the power switching device may improve the stability of a power supply.

The invention is directed to a power switching method, and the power switching method may improve the stability of a power supply.

The invention is directed to a projection device, and the projection device may improve the stability of a power supply.

Additional aspects and advantages of the invention will be set forth in part in following description.

In order to achieve one or part of or all the objectives or other objectives, a power switch is provided in an embodiment of the invention. The power switching device including a first switch, a second switch, and a switch unit is provided. The first switch receives a first power and determines whether to output the first power as an output voltage according to a first switching signal. The second switch receives a second power and determines whether to output the second power as the output voltage according to a second switching signal. The switch unit is coupled to the first switch and the second switch. The switch unit compares the voltage level of the first power with the voltage level of the second power and outputs the first switching signal and the second switching signal to turn on at least one of the first switch and the second switch. The switch unit includes a first current transducer, a second current transducer, a hysteresis voltage comparator, a current comparator, and a logical operation unit. The first current transducer receives the first power and outputs the first power to the first switch and a first current corresponding to the first power. The second current transducer receives the second power and outputs the second power to the second switch and a second current corresponding to the second power. The hysteresis voltage comparator is coupled to the first current transducer and the second current transducer. The hysteresis voltage comparator receives and compares the voltage level of the first power with the voltage level of the second power and outputs a first comparison signal. The current comparator is coupled to the first current transducer and the second current transducer. The current comparator receives and compares the first current and the second current and outputs a second comparison signal. The logical operation unit is coupled to the first switch, the second switch, the hysteresis voltage comparator, and the current comparator. The logical operation unit receives the first comparison signal and the second comparison signal and outputs the first switching signal and the second switching signal after performing a logical operation.

According to another embodiment of the invention, a power switching device including a first switch, a second switch, and a switch unit is provided. The first switch receives a first power and determines whether to output the first power as an output voltage according to a first switching signal. The second switch receives a second power and determines whether to output the second power as the output voltage according to a second switching signal. The switch unit is coupled to the first switch and the second switch. The switch unit compares the voltage level of the first power with the voltage level of the second power and outputs the first switching signal and the second switching signal to turn on at least one of the first switch and the second switch. The switch unit includes a hysteresis voltage comparator, a logical operation unit, a first diode, a second diode, a third switch, and a pulse signal generator. The hysteresis voltage comparator receives the first power and the second power, compares the voltage level of the first power with the voltage level of the second power, and outputs a comparison signal. The logical operation unit is coupled to the hysteresis voltage comparator. The logical operation unit receives the comparison signal and a control signal and outputs the first switching signal and the second switching signal after performing a logical operation. The anode of the first diode receives the first power, the anode of the second diode receives the second power, and the cathode of the second diode is coupled to the cathode of the first diode. The third switch is coupled to the cathode of the first diode and the cathode of the second diode and determines whether to output one of the first power and the second power as the output voltage according to a pulse signal. The pulse signal generator is coupled to the hysteresis voltage comparator and the third switch. The pulse signal generator detects the rising and falling edges of the comparison signal and generates the pulse signal at a predetermined time.

According to yet another embodiment of the invention, a power switching method including following steps is provided. A first power and a second power are received, and the voltage level of the first power is compared with the voltage level of the second power. One of the first power and the second power having the higher voltage level is sustained by using one of the first power and the second power having the lower voltage level until one of the first power and the second power having the higher voltage level stabilizes. At least one of the first power and the second power having the higher voltage level and being already stabilized is output as an output voltage.

According to still another embodiment of the invention, a projection device including a rechargeable battery, an interface, and a power switching device is provided. The rechargeable battery supplies a first power. The interface receives and transmits a second power. The power switching device is coupled to the rechargeable battery and the interface. The power switching device receives the first power and the second power and compares the voltage level of the first power with the voltage level of the second power. The power switching device sustains one of the first power and the second power having the higher voltage level by using one of the first power and the second power having the lower voltage level until one of the first power and the second power having the higher voltage level stabilizes. The power switching device outputs at least one of the first power and the second power having the higher voltage level and being already stabilized as an output voltage.

In an embodiment of the invention, the projection device further includes a DC/DC converter coupled to the power switching device. The DC/DC converter receives the output voltage and converts the output voltage into a plurality of DC voltages as operating voltages of internal related components of the projection device.

In summary, the embodiment or embodiments of the invention may have at least one of the following advantages. The voltages and currents of two powers are monitored, and the two powers are switched only when the voltage and current of one of the two powers are both greater than the voltage and current of the other power. On the other hand, when the two powers are switched, the power with the higher voltage level is sustained by using the power with the lower voltage level until the power with the higher voltage level stabilizes. Thus, decrease in the output voltage caused by overload on the power supply after the two powers are switched is avoided. In addition, the two powers are compared with each other by using a hysteresis voltage comparator, such that alternative switching between the two powers when the two powers have similar voltage levels is avoided. Thus, a more stable power supply is achieved.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 3:
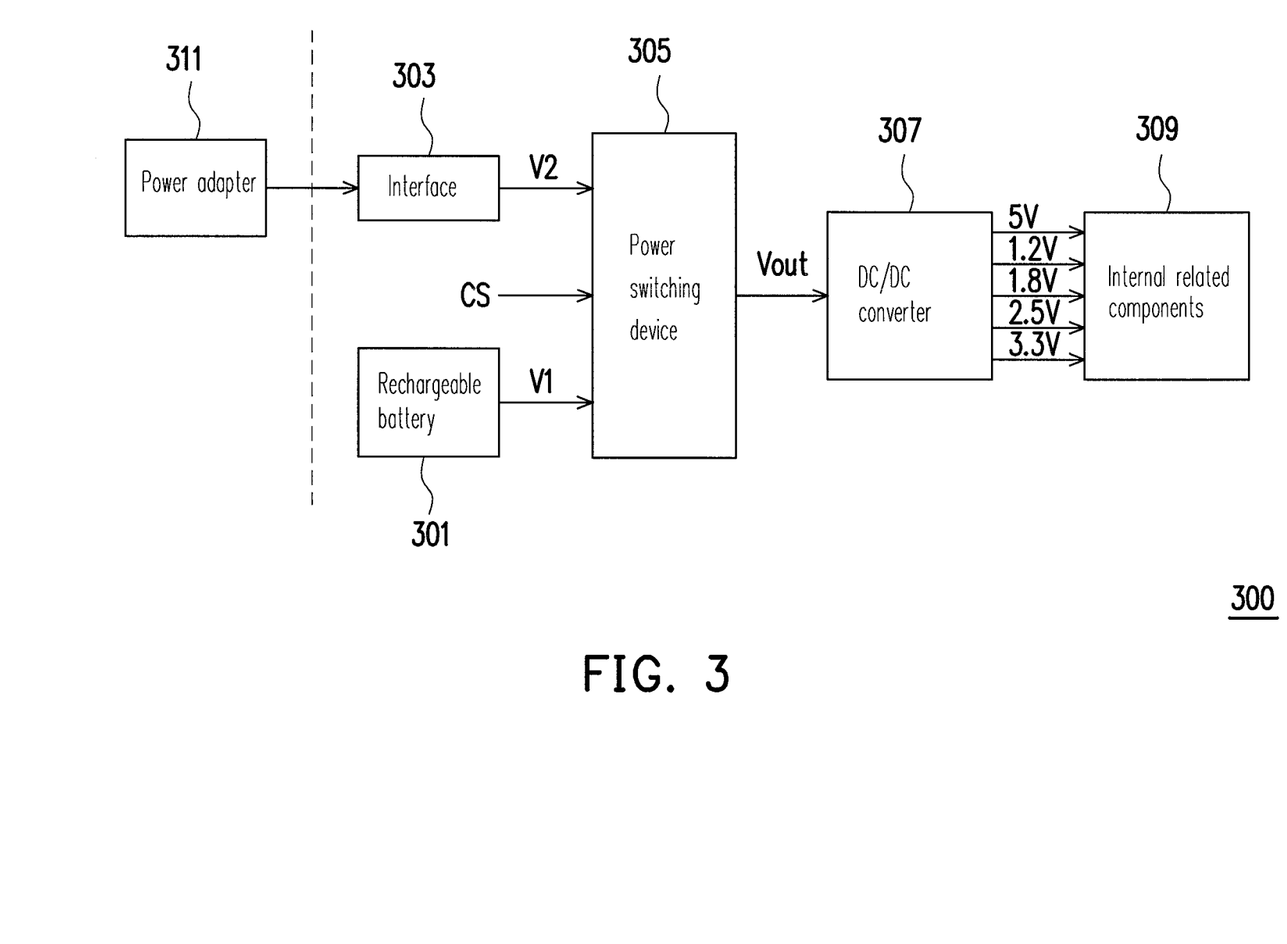
FIG. 3 is a schematic block diagram of a projection device according to an embodiment of the invention.

Referring to FIG. 3, the projection device 300 includes a rechargeable battery 301, an interface 303, a power switching device 305, a DC/DC converter 307, internal related components 309, and a power adapter 311. In the present embodiment, the rechargeable battery 301 supplies a first power V1. The interface 303 may be a DC power jack coupled with the power adapter 311 for receiving and transmitting a second power V2. The first power V1 and the second power V2 are both DC powers.

The power switching device 305 is coupled to the rechargeable battery 301 and the interface 303. The power switching device 305 receives the first power V1 and the second power V2 and compares the voltage levels thereof. Then, the power switching device 305 sustains one of the first power V1 and the second power V2 having the higher voltage level by using one of the first power V1 and the second power V2 having the lower voltage level until one of the first power V1 and the second power V2 having the higher voltage level stabilizes. After that, the power switching device 305 outputs at least one of the first power V1 and the second power V2 having the higher voltage level and being already stabilized as an output voltage Vout.

The DC/DC converter 307 is coupled to the power switching device 305. The DC/DC converter 307 receives the output voltage Vout from the power switching device 305 and converts the output voltage Vout into a plurality of DC voltages (for example, 5V, 1.2V, 1.8V, 2.5V, and 3.3V; however, the invention is not limited thereto) as operating voltages of the internal related components 309 of the projection device 300.

Figure 4:
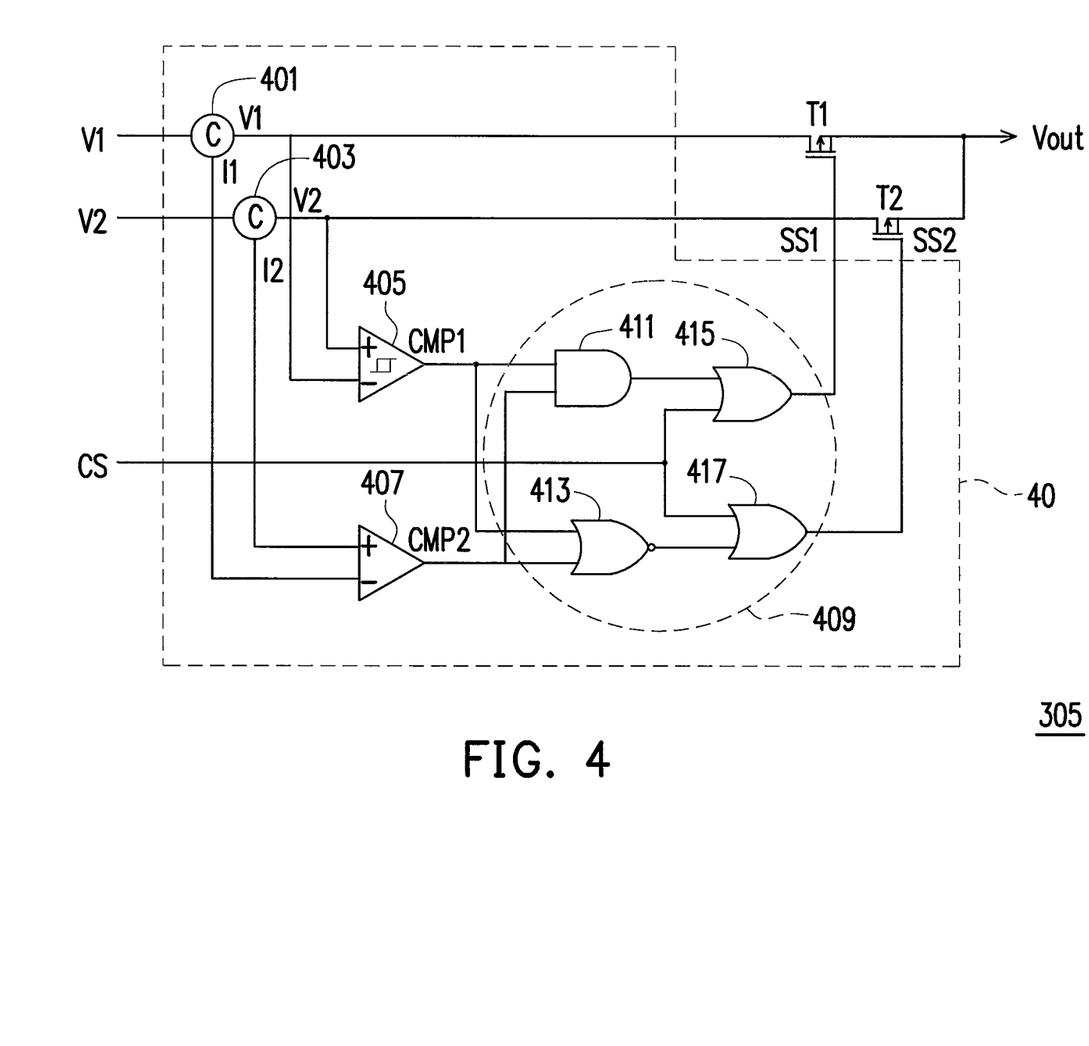
FIG. 4 is a diagram of a power switching device according to an embodiment of the invention.

Referring to both FIG. 3 and FIG. 4, the power switching device 305 includes two switches T1 and T2 and a switch unit 40. The switch T1 receives the first power V1 and determines whether to output the first power V1 as the output voltage Vout according to a switching signal SS1. The switch T2 receives the second power V2 and determines whether to output the second power V2 as the output voltage Vout according to a switching signal SS2. The switch unit 40 is coupled to the switch T1 and the switch T2. The switch unit 40 compares the voltage level of the first power V1 and the voltage level of the second power V2 and outputs the switching signal SS1 and the switching signal SS2 to turn on at least one of the switch T1 and the switch T2.

In the present embodiment, the switch unit 40 includes a current transducer 401, a current transducer 403, a hysteresis voltage comparator 405, a current comparator 407, and a logical operation unit 409. The current transducer 401 receives the first power V1 and outputs the first power V1 to the switch T1 and a first current I1 corresponding to the first power V1. The current transducer 403 receives the second power V2 and outputs the second power V2 to the switch T2 and a second current I2 corresponding to the second power V2.

Figure 5A:
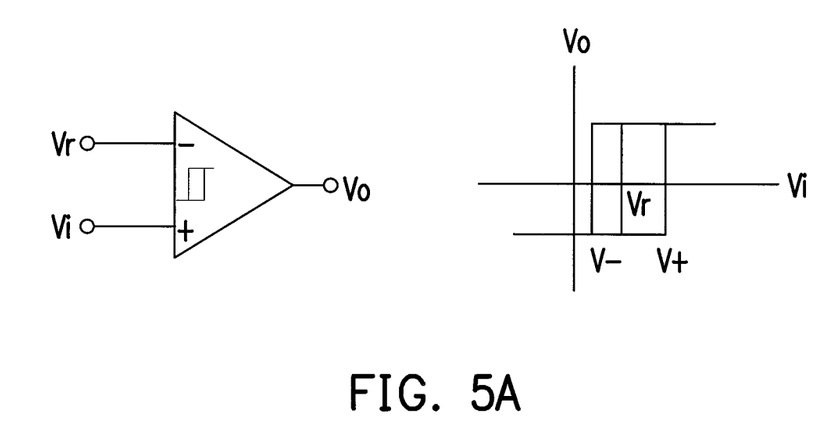
FIG. 5A illustrates a hysteresis voltage comparator and a conversion characteristic curve thereof according to an embodiment of the invention.
Figure 5B:
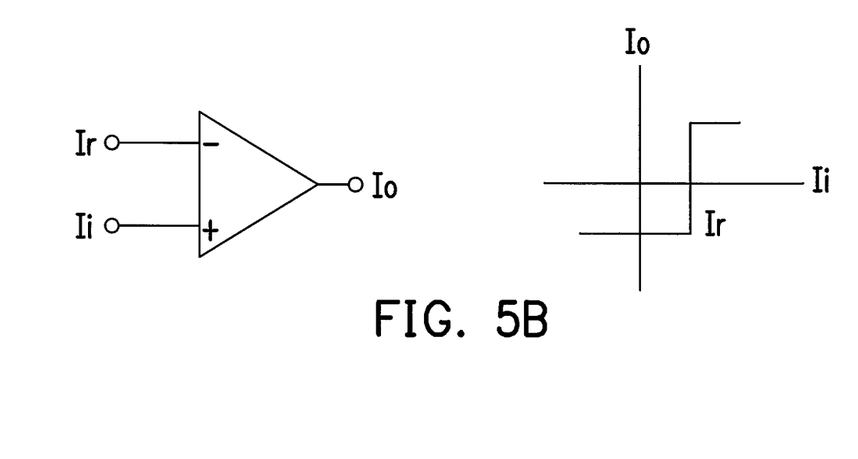
FIG. 5B illustrates a current comparator and a conversion characteristic curve thereof according to an embodiment of the invention.

The hysteresis voltage comparator 405 is coupled to the current transducer 401 and the current transducer 403. The hysteresis voltage comparator 405 receives the first power V1 and the second power V2, compares the voltage level of the first power V1 with the voltage level of the second power V2, and outputs a first comparison signal CMP1. The current comparator 407 is coupled to the current transducer 401 and the current transducer 403. The current comparator 407 receives and compares the first current I1 and the second current I2 and outputs a second comparison signal CMP2. In the present embodiment, the hysteresis voltage comparator 405 and the conversion characteristic curve thereof are illustrated in FIG. 5A. In addition, the current comparator 407 and the conversion characteristic curve thereof are illustrated in FIG. 5B.

The logical operation unit 409 is coupled to the switch T1, the switch T2, the hysteresis voltage comparator 405, and the current comparator 407. The logical operation unit 409 receives the first comparison signal CMP1 and the second comparison signal CMP2 and outputs the switching signal SS1 and the switching signal SS2 after performing a logical operation. In the present embodiment, the logical operation unit 409 includes an AND gate 411, a NOR gate 413, and two OR gates 415 and 417. The two input terminals of the AND gate 411 respectively receive the first comparison signal CMP1 and the second comparison signal CMP2.

The two input terminals of the NOR gate 413 respectively receive the first comparison signal CMP1 and the second comparison signal CMP2. The first input terminal of the OR gate 415 is coupled to the output terminal of the AND gate 411, the second input terminal thereof receives a control signal CS, and the output terminal thereof outputs the switching signal SS1. The first input terminal of the OR gate 417 is coupled to the output terminal of the NOR gate 413, the second input terminal thereof receives the control signal CS, and the output terminal thereof outputs the switching signal SS2.

In the present embodiment, the switch T1 and the switch T2 are P-type field effect transistors (FETs). However, the invention is not limited thereto. Thereinafter, the switch T1 and the switch T2 are referred to as P-type FET T1 and P-type FET T2. The gate of the P-type FET T1 is coupled to the output terminal of the OR gate 415, the source of the P-type FET T1 is coupled to the current transducer 401 for receiving the first power V1, and the drain of the P-type FET T1 outputs the first power V1 as the output voltage Vout. The gate of the P-type FET T2 is coupled to the output terminal of the OR gate 417, the source of the P-type FET T2 is coupled to the current transducer 403 for receiving the second power V2, and the drain of the P-type FET T2 is coupled to the drain of the P-type FET T1 for outputting the second power V2 as the output voltage Vout.

As described above, assuming that the voltage level of the first power V1 is lower than the voltage level of the second power V2 (V1<V2), the first current I1 is smaller than the second current I2 (I1<I2), and the control signal CS is at a logic low level, the output terminal of the hysteresis voltage comparator 405 outputs the first comparison signal CMP1 at a logic high level, and the output terminal of the current transducer 403 outputs the second comparison signal CMP2 also at the logic high level. In this case, the logical operation unit 409 outputs the switching signal SS1 at the logic high level and the switching signal SS2 at the logic low level so as to turn off the P-type FET T1 and turn on the P-type FET T2.

Accordingly, the second power V2 is output to the DC/DC converter 307 as the output voltage Vout.

On the other hand, assuming that the voltage level of the first power V1 is higher than the voltage level of the second power V2 (V1>V2), the first current I1 is smaller than the second current I2 (I1<I2), and the control signal CS is at the logic low level, the output terminal of the hysteresis voltage comparator 405 outputs the first comparison signal CMP1 at the logic low level, and the output terminal of the current transducer 403 still outputs the second comparison signal CMP2 at the logic high level. In this case, the logical operation unit 409 outputs the switching signal SS1 and the switching signal SS2 at the logic low level so as to turn on both the P-type FET T1 and the P-type FET T2. Accordingly, both the first power V1 and the second power V2 are output to the DC/DC converter 307 as the output voltage Vout.

Additionally, assuming that the voltage level of the first power V1 is higher than the voltage level of the second power V2 (V1>V2), the first current I1 is greater than the second current I2 (I1>I2), and the control signal CS is at the logic low level, the output terminal of the hysteresis voltage comparator 405 outputs the first comparison signal CMP1 at the logic low level, and the output terminal of the current transducer 403 outputs the second comparison signal CMP2 also at the logic low level. In this case, the logical operation unit 409 outputs the switching signal SS1 at the logic low level and the switching signal SS2 at the logic high level so as to turn on the P-type FET T1 and turn off the P-type FET T2. Accordingly, the first power V1 is output to the DC/DC converter 307 as the output voltage Vout.

Moreover, assuming that the voltage level of the first power V1 is lower than the voltage level of the second power V2 (V1<V2), the first current I1 is smaller than the second current I2 (I1>I2), and the control signal CS is at the logic low level, the output terminal of the hysteresis voltage comparator 405 outputs the first comparison signal CMP1 at the logic high level, and the output terminal of the current transducer 403 still outputs the second comparison signal CMP2 at the logic low level. In this case, the logical operation unit 409 outputs the switching signal SS1 and the switching signal SS2 at the logic low level so as to turn on both the P-type FET T1 and the P-type FET T2. Accordingly, both the first power V1 and the second power V2 are output to the DC/DC converter 307 as the output voltage Vout.

Furthermore, assuming that the voltage level of the first power V1 is lower than the voltage level of the second power V2 (V1<V2), the first current I1 is smaller than the second current I2 (I1<I2), and the control signal CS is at the logic low level, the output terminal of the hysteresis voltage comparator 405 outputs the first comparison signal CMP1 at the logic high level, and the output terminal of the current transducer 403 outputs the second comparison signal CMP2 also at the logic high level. In this case, the logical operation unit 409 outputs the switching signal SS1 at the logic high level and the switching signal SS2 at the logic low level so as to turn off the P-type FET T1 and turn on the P-type FET T2. Accordingly, the second power V2 is output to the DC/DC converter 307 as the output voltage Vout.

As described above, in the present embodiment, the voltages and currents of two powers are monitored and the two powers are switched only when the voltage and current of one of the two powers are both greater than the voltage and current of the other power. Accordingly, decrease in the output voltage caused by overload on the power supply after the two powers are switched is avoided, and accordingly system power off, hang up, or reset of the projection device 300 when the two powers are switched is also avoided. Besides, the two powers are compared with each other by using the hysteresis voltage comparator 405 such that the alternative switching of the two powers when the two powers have similar voltage levels is effectively avoided. Accordingly, a more stable power supply is achieved.

It should be mentioned that if the control signal CS is set to the logic high level, the P-type FET T1 and the P-type FET T2 are compulsively turned off and accordingly the first power V1 and the second power V2 may not be output as the output voltage Vout. Thereby, the projection device 300 may be compulsively powered off by setting the control signal CS to the logic high level. Additionally, in other embodiments of the present invention, the P-type FET T1 and the P-type FET T2 may be respectively replaced with N-type FETs by simply reversing the positive and negative input terminals of the hysteresis voltage comparator 405 and the current comparator 407 or the logic states of the switching signal SS1 and the switching signal SS2. Variations of embodiments of the invention similar to that described above are also within the scope of the invention.

It should be noted that in embodiments of the invention, the projection device 300 may be a portable pico projector.

Figure 6:
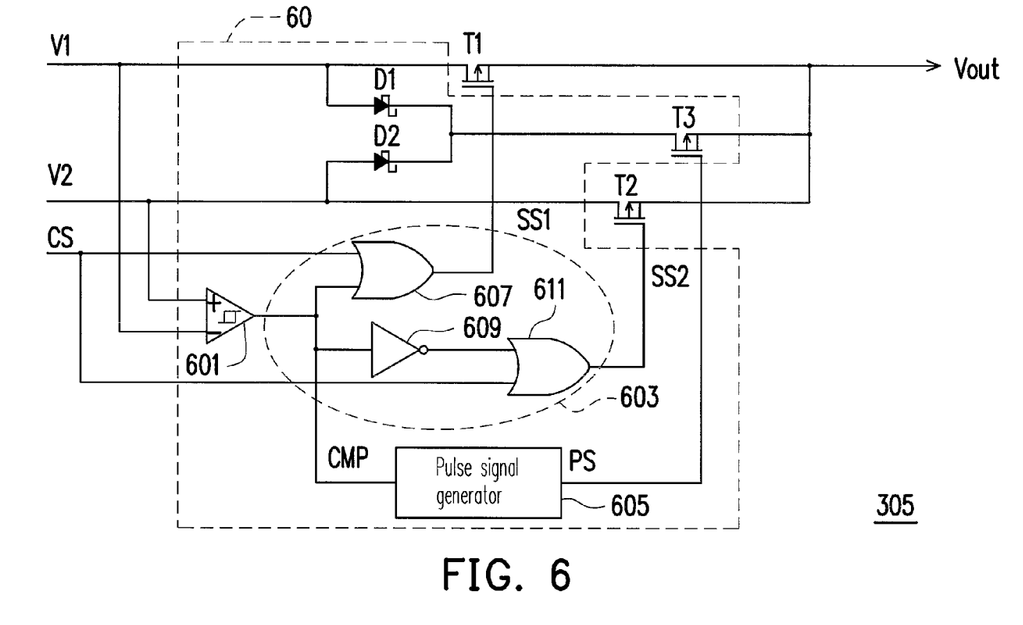
FIG. 6 is a diagram of a power switching device according to another embodiment of the invention.

Referring to both FIG. 3 and FIG. 6, the power switching device 305 includes two switches T1 and T2 and a switch unit 60. The function of the switch T1 and the switch T2 is similar to that described in foregoing embodiment therefore will not be described herein. The switch unit 60 is coupled to the switch T1 and the switch T2. The switch unit 60 compares the voltage level of the first power V1 with the voltage level of the second power V2 and outputs a switching signal SS1 and a switching signal SS2 to turn on at least one of the switch T1 and the switch T2.

In the present embodiment, the switch unit 60 includes a hysteresis voltage comparator 601, a logical operation unit 603, a diode D1, a diode D2, a switch T3, and a pulse signal generator 605. The hysteresis voltage comparator 601 receives the first power V1 and the second power V2, compares the voltage level of the first power V1 with the voltage level of the second power V2, and outputs a comparison signal CMP. The hysteresis voltage comparator 601 in the present embodiment and the conversion characteristic curve thereof are also as those illustrated in FIG. 5A.

The logical operation unit 603 is coupled to the hysteresis voltage comparator 601. The logical operation unit 603 receives the comparison signal CMP and a control signal CS and outputs the switching signal SS1 and the switching signal SS2 after performing a logical operation. In the present embodiment, the logical operation unit 603 includes an OR gate 607, a NOT gate 609, and an OR gate 611. The first input terminal of the OR gate 607 receives the control signal CS, the second input terminal thereof receives the comparison signal CMP, and the output terminal thereof outputs the switching signal SS1. The input terminal of the NOT gate 609 is coupled to the second input terminal of the OR gate 607, and the output terminal of the NOT gate 609 is coupled to the first input terminal of the OR gate 611. The second input terminal of the OR gate 611 receives the control signal CS, and the output terminal thereof outputs the switching signal SS2.

Figure 7:
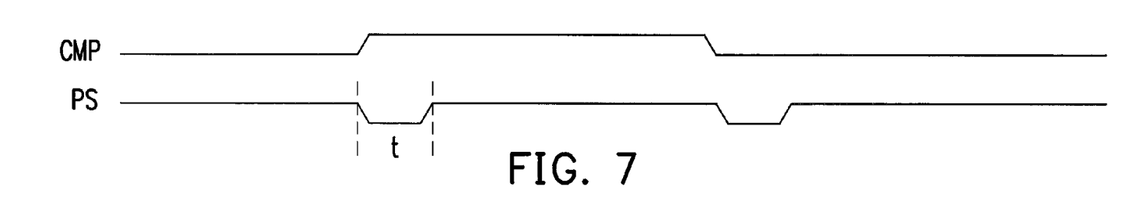
FIG. 7 illustrates the waveforms of a comparison signal and a control signal according to an embodiment of the invention.

The anode of the diode D1 and the anode of the diode D2 respectively receive the first power V1 and the second power V2, and the cathode of the diode D1 and the cathode of the diode D2 are coupled with each other. The switch T3 is coupled to the cathode of the diode D1 and the cathode of the diode D2. The switch T3 determines whether to output at least one of the first power V1 and the second power V2 as an output voltage Vout according to a pulse signal PS. The pulse signal generator 605 is coupled to the hysteresis voltage comparator 601 and the switch T3. The pulse signal generator 605 detects the rising and falling edges of the comparison signal CMP and generates the pulse signal PS at a predetermined time t, as shown in FIG. 7.

In the present embodiment, the switch T1, the switch T2, and the switch T3 are all P-type FETs. However, the invention is not limited thereto. Thereinafter, the switch T1, the switch T2, and the switch T3 are respectively referred to as P-type FET T1, P-type FET T2, and P-type FET T3. The gate of the P-type FET T1 is coupled to the output terminal of the OR gate 607, the source of the P-type FET T1 is coupled to the anode of the diode D1 for receiving the first power V1, and the drain of the P-type FET T1 outputs the first power V1. The gate of the P-type FET T2 is coupled to the output terminal of the OR gate 611, the source of the P-type FET T2 is coupled to the anode of the diode D2 for receiving the second power V2, and the drain of the P-type FET T2 outputs the second power V2. The gate of the P-type FET T3 is coupled to the pulse signal generator 605 for receiving the pulse signal PS, the source of the P-type FET T3 is coupled to the cathode of the diode D1 and the cathode of the diode D2, and the drain of the P-type FET T3 is coupled to the drain of the P-type FET T1 and the drain of the P-type FET T2 for outputting at least one of the first power V1 and the second power V2.

As described above, assuming that the power switching device 305 is about to switch from the first power V1 to the second power V2 (i.e., the voltage level of the first power V1 is lower than the voltage level of the second power V2 (V1<V2) and the control signal CS is at a logic low level), the hysteresis voltage comparator 601 outputs the comparison signal CMP at a logic high level. In this case, the logical operation unit 603 outputs the switching signal SS1 at the logic high level and the switching signal SS2 at the logic low level so as to turn off the P-type FET T1 and turn on the P-type FET T2. Meanwhile, because the pulse signal generator 605 detects a rising edge of the comparison signal CMP, the pulse signal generator 605 generates the pulse signal PS at the predetermined time t to turn on the P-type FET T3.

Thereby, the P-type FET T2 and the P-type FET T3 are both turned on within the predetermined time t. Accordingly, both the first power V1 and the second power V2 are output to the DC/DC converter 307 as the output voltage Vout. Besides, only the P-type FET T2 is turned on after the predetermined time t. Accordingly, the second power V2 is output to the DC/DC converter 307 as the output voltage Vout. In the present embodiment, the predetermined time t is the total time required to stabilize after the second power V2 is output as the output voltage Vout, and the predetermined time t may be determined according to the actual design requirement.

On the other hand, assuming that the power switching device 305 is about to switch from the second power V2 to the first power V1 (i.e., the voltage level of the first power V1 is higher than the voltage level of the second power V2 (V1>V2) and the control signal CS is at the logic low level), the hysteresis voltage comparator 601 outputs the comparison signal CMP at the logic high level. In this case, the logical operation unit 603 outputs the switching signal SS1 at the logic low level and the switching signal SS2 at the logic high level so as to turn on the P-type FET T1 and turn off the P-type FET T2. Meanwhile, because the pulse signal generator 605 detects a falling edge of the comparison signal CMP, the pulse signal generator 605 generates the pulse signal PS at the predetermined time t to turn on the P-type FET T3.

Similarly, within the predetermined time t, both the P-type FET T2 and the P-type FET T3 are turned on. Accordingly, both the first power V1 and the second power V2 are output to the DC/DC converter 307 as the output voltage Vout. In addition, after the predetermined time t, only the P-type FET T1 is turned on. Accordingly, the first power V1 is output to the DC/DC converter 307 as the output voltage Vout. In the present embodiment, the predetermined time t is the total time required to stabilize after the first power V1 is output as the output voltage Vout, and the predetermined time t may be determined according to the actual design requirement.

As described above, in the present embodiment, the power with the higher voltage level is sustained by using the power with the lower voltage level until the power with the higher voltage level stabilizes, and the two powers are then switched. Accordingly, decrease in the output voltage caused by overload on the power supply after the two powers are switched is avoided, and accordingly system power off, hang up, or reset of the projection device 300 when the two powers are switched is also avoided. Besides, the two powers are compared with each other by using the hysteresis voltage comparator 601, such that the alternative switching of the two powers when the two powers have similar voltage levels is effectively avoided. Accordingly, a more stable power supply is achieved.

It should be mentioned herein that if the control signal CS is set to a logic high level, the P-type FET T1 and the P-type FET T2 are compulsively turned off and accordingly the first power V1 and the second power V2 may not be output as the output voltage Vout. Thus, the projection device 300 may be compulsively powered off by setting the control signal CS to the logic high level. Additionally, in other embodiments of the invention, the P-type FET T1, the P-type FET T2, and the P-type FET T3 may be respectively replaced with N-type FETs by simply reversing the positive and negative input terminals of the hysteresis voltage comparator 601 and the logic state of the pulse signal P or the logic states of the switching signal SS1, the switching signal SS2, and the pulse signal PS. Variations of embodiments of the invention similar to that described above are also within the scope of the invention.

Figure 8:
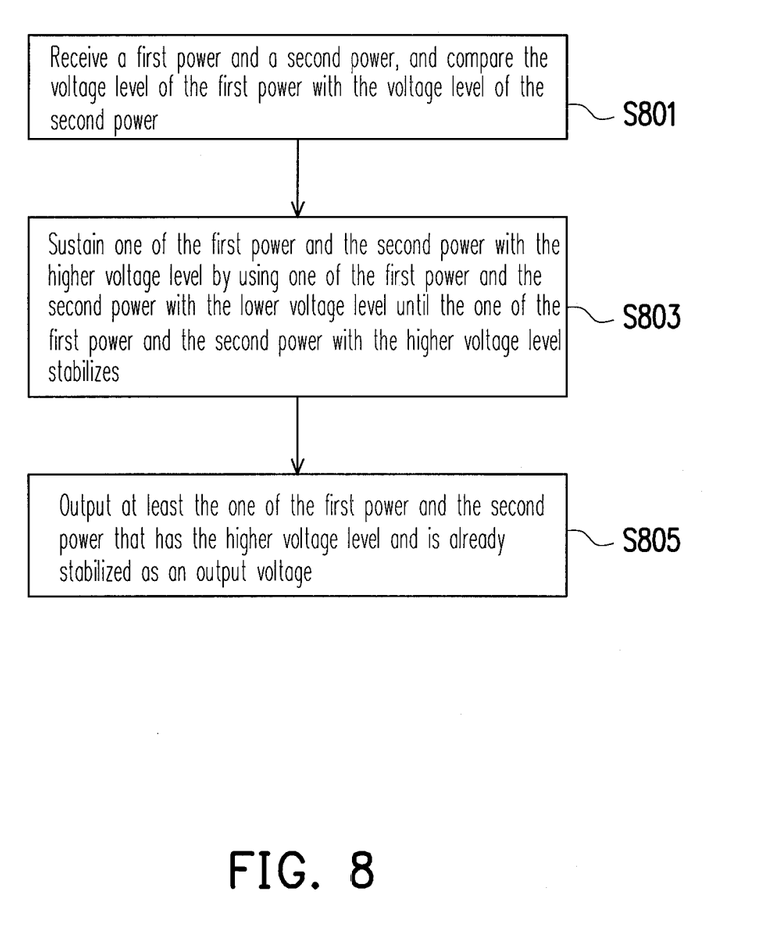
FIG. 8 is a flowchart of a power switching method according to an embodiment of the invention.

Referring to FIG. 8, the power switching method in the present embodiment includes following steps. A first power and a second power are received, and the voltage level of the first power is compared with the voltage level of the second power (step S801). One of the first power and the second power having the higher voltage level is sustained by using one of the first power and the second power having the lower voltage level until one of the first power and the second power having the higher voltage level stabilizes (step S803). At least one of the first power and the second power having the higher voltage level and being already stabilized is output as an output voltage (step S805).

In summary, the embodiment or embodiments of the invention may have at least one of the following advantages. The voltages and currents of two powers are monitored and the two powers are switched only when the voltage and current of one of the two powers are both greater than the voltage and current of the other power. On the other hand, the power with the higher voltage level is sustained by using the power with the lower voltage level, and the two powers are switched only when the power with the higher voltage level stabilizes. Accordingly, decrease in the output voltage caused by overload on the power supply after the two powers are switched is avoided. Moreover, the two powers are compared with each other by using a hysteresis voltage comparator, such that the alternative switching of the two powers when the two powers have similar voltage levels is effectively avoided. Accordingly, the stability of the power supply is improved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A power switching device, comprising:
a first switch, for receiving a first power and determining whether to output the first power as an output voltage according to a first switching signal;
a second switch, for receiving a second power and determining whether to output the second power as the output voltage according to a second switching signal; and
a switch unit, coupled to the first switch and the second switch, for comparing a voltage level of the first power and a voltage level of the second power and outputting the first switching signal and the second switching signal to turn on at least one of the first switch and the second switch, wherein the switch unit comprises:
a first current transducer, for receiving the first power and outputting the first power to the first switch and a first current corresponding to the first power;
a second current transducer, for receiving the second power and outputting the second power to the second switch and a second current corresponding to the second power;
a hysteresis voltage comparator, coupled to the first current transducer and the second current transducer, for receiving and comparing the voltage level of the first power and the voltage level of the second power and outputting a first comparison signal;
a current comparator, coupled to the first current transducer and the second current transducer, for receiving and comparing the first current and the second current and outputting a second comparison signal; and
a logical operation unit, coupled to the first switch, the second switch, the hysteresis voltage comparator, and the current comparator, for receiving the first comparison signal and the second comparison signal to perform a logical operation, and thereby outputting the first switching signal and the second switching signal.

2. The power switching device according to claim 1, wherein the logical operation unit comprises:
an AND gate, having two input terminals for respectively receiving the first comparison signal and the second comparison signal;
a NOR gate, having two input terminals for respectively receiving the first comparison signal and the second comparison signal;
a first OR gate, having a first input terminal coupled to an output terminal of the AND gate, a second input terminal for receiving a control signal, and an output terminal for outputting the first switching signal; and
a second OR gate, having a first input terminal coupled to an output terminal of the NOR gate, a second input terminal for receiving the control signal, and an output terminal for outputting the second switching signal.

3. The power switching device according to claim 2, wherein
the first switch is a first transistor, a gate of the first transistor is coupled to the output terminal of the first OR gate, a source of the first transistor is coupled to the first current transducer for receiving the first power, and a drain of the first transistor outputs the first power, and
the second switch is a second transistor, a gate of the second transistor is coupled to the output terminal of the second OR gate, a source of the second transistor is coupled to the second current transducer for receiving the second power, and a drain of the second transistor is coupled to the drain of the first transistor for outputting the second power.

4. A power switching device, comprising:
a first switch, for receiving a first power and determining whether to output the first power as an output voltage according to a first switching signal;
a second switch, for receiving a second power and determining whether to output the second power as the output voltage according to a second switching signal; and
a switch unit, coupled to the first switch and the second switch, for comparing a voltage level of the first power and a voltage level of the second power and outputting the first switching signal and the second switching signal to turn on at least one of the first switch and the second switch, wherein the switch unit comprises:
a hysteresis voltage comparator, for receiving and comparing the voltage level of the first power and the voltage level of the second power and outputting a comparison signal;
a logical operation unit, coupled to the hysteresis voltage comparator, for receiving the comparison signal and a control signal to perform a logical operation, and thereby outputting the first switching signal and the second switching signal;
a first diode, having an anode for receiving the first power;
a second diode, having an anode for receiving the second power and a cathode coupled to a cathode of the first diode;
a third switch, coupled to the cathode of the first diode and the cathode of the second diode, for determining whether to output one of the first power and the second power as the output voltage according to a pulse signal; and a pulse signal generator, coupled to the hysteresis voltage comparator and the third switch, for detecting rising edges and falling edges of the comparison signal and generating the pulse signal at a predetermined time, wherein the logic operation unit comprises:
a first OR gate, having a first input terminal for receiving the control signal, a second input terminal for receiving the comparison signal, and an output terminal for outputting the first switching signal;
a NOT gate, having an input terminal coupled to the second input terminal of the first OR gate; and
a second OR gate, having a first input terminal coupled to an output terminal of the NOT gate, a second input terminal for receiving the control signal, and an output terminal for outputting the second switching signal.

5. The power switching device according to claim 4, wherein
the first switch is a first transistor, a gate of the first transistor is coupled to the output terminal of the first OR gate, a source of the first transistor is coupled to the anode of the first diode for receiving the first power, and a drain of the first transistor outputs the first power,
the second switch is a second transistor, a gate of the second transistor is coupled to the output terminal of the second OR gate, a source of the second transistor is coupled to the anode of the second diode for receiving the second power, and a drain of the second transistor is coupled to the drain of the first transistor for outputting the second power, and
the third switch is a third transistor, a gate of the third transistor is coupled to the pulse signal generator for receiving the pulse signal, a source of the third transistor is coupled to the cathode of the first diode and the cathode of the second diode, and a drain of the third transistor is coupled to the drain of the first transistor and the drain of the second transistor for outputting one of the first power and the second power.

6. A power switching method, comprising:
receiving a first power and determining whether to output the first power as an output voltage according to a first switching signal;
receiving a second power and determining whether to output the second power as the output voltage according to a second switching signal; and
comparing a voltage level of the first power and a voltage level of the second power and outputting the first switching signal and the second switching signal,
wherein the step of comparing and outputting comprises:
receiving the first power and outputting the first power and a first current corresponding to the first power;
receiving the second power and outputting the second power and a second current corresponding to the second power;
receiving and comparing the voltage level of the first power and the voltage level of the second power and outputting a first comparison signal;
receiving and comparing the first current and the second current and outputting a second comparison signal; and
receiving the first comparison signal and the second comparison signal to perform a logical operation, and thereby outputting the first switching signal and the second switching signal.

7. A projection device, comprising:
a rechargeable battery, for supplying a first power;
an interface, for receiving and transmitting a second power; and
a power switching device, coupled to the rechargeable battery and the interface, for receiving and comparing a voltage level of the first power and a voltage level of the second power, sustaining one of the first power and the second power having the higher voltage level by using one of the first power and the second power having the lower voltage level until one of the first power and the second power having the higher voltage level stabilizes, and outputting one of the first power and the second power that is stabilized and has the higher voltage level as an output voltage,
wherein the power switching device comprises:
a first switch, for receiving the first power and determining whether to output the first power as the output voltage according to a first switching signal;
a second switch, for receiving the second power and determining whether to output the second power as the output voltage according to a second switching signal; and
a switch unit, coupled to the first switch and the second switch, for comparing the voltage level of the first power and the voltage level of the second power and outputting the first switching signal and the second switching signal to turn on at least one of the first switch and the second switch,
wherein the switch unit comprises:
a first current transducer, for receiving the first power and outputting the first power to the first switch and a first current corresponding to the first power;
a second current transducer, for receiving the second power and outputting the second power to the second switch and a second current corresponding to the second power;
a hysteresis voltage comparator, coupled to the first current transducer and the second current transducer, for receiving and comparing the voltage level of the first power and the voltage level of the second power and outputting a first comparison signal;
a current comparator, coupled to the first current transducer and the second current transducer, for receiving and comparing the first current and the second current and outputting a second comparison signal; and
a logical operation unit, coupled to the first switch, the second switch, the hysteresis voltage comparator, and the current comparator, for receiving the first comparison signal and the second comparison signal to perform a logical operation, and thereby outputting the first switching signal and the second switching signal.

8. The projection device according to claim 7, wherein the logical operation unit comprises:
an AND gate, having two input terminals for respectively receiving the first comparison signal and the second comparison signal;
a NOR gate, having two input terminals for respectively receiving the first comparison signal and the second comparison signal;
a first OR gate, having a first input terminal coupled to an output terminal of the AND gate, a second input terminal for receiving a control signal, and an output terminal for outputting the first switching signal; and
a second OR gate, having a first input terminal coupled to an output terminal of the NOR gate, a second input terminal for receiving the control signal, and an output terminal for outputting the second switching signal.

9. The projection device according to claim 8, wherein the first switch is a first transistor, a gate of the first transistor is coupled to the output terminal of the first OR gate, a source of the first transistor is coupled to the first current transducer for receiving the first power, and a drain of the first transistor outputs the first power.

10. The projection device according to claim 9, wherein the second switch is a second transistor, a gate of the second transistor is coupled to the output terminal of the second OR gate, a source of the second transistor is coupled to the second current transducer for receiving the second power, and a drain of the second transistor is coupled to the drain of the first transistor for outputting the second power.

11. The projection device according to claim 10, wherein the first transistor and the second transistor are P-type field effect transistors (FETs).

12. The projection device according to claim 10, wherein the first transistor and the second transistor are N-type field effect transistors.

13. The projection device according to claim 7 further comprising:
a DC/DC converter, coupled to the power switching device, for receiving and converting the output voltage into a plurality of DC voltages as operating voltages of internal related components of the projection device.

14. The projection device according to claim 7 further comprising:
a power adapter, coupled to the interface, for supplying the second power.

15. The projection device according to claim 14, wherein the interface is a DC power jack.

16. A projection device, comprising:
a rechargeable battery, for supplying a first power;
an interface, for receiving and transmitting a second power; and
a power switching device, coupled to the rechargeable battery and the interface, for receiving and comparing a voltage level of the first power and a voltage level of the second power, sustaining one of the first power and the second power having the higher voltage level by using one of the first power and the second power having the lower voltage level until one of the first power and the second power having the higher voltage level stabilizes, and outputting one of the first power and the second power that is stabilized and has the higher voltage level as an output voltage,
wherein the power switching device comprises:
a first switch, for receiving the first power and determining whether to output the first power as the output voltage according to a first switching signal;
a second switch, for receiving the second power and determining whether to output the second power as the output voltage according to a second switching signal; and
a switch unit, coupled to the first switch and the second switch, for comparing the voltage level of the first power and the voltage level of the second power and outputting the first switching signal and the second switching signal to turn on at least one of the first switch and the second switch,
wherein the switch unit comprises:
a hysteresis voltage comparator, for receiving and comparing the voltage level of the first power and the voltage level of the second power and outputting a comparison signal;
a logical operation unit, coupled to the hysteresis voltage comparator, for receiving the comparison signal and the control signal to perform a logical operation accordingly, and thereby outputting the first switching signal and the second switching signal;
a first diode, having an anode for receiving the first power;
a second diode, having an anode for receiving the second power and a cathode coupled to a cathode of the first diode;
a third switch, coupled to the cathode of the first diode and the cathode of the second diode, for determining whether to output one of the first power and the second power as the output voltage according to a pulse signal; and
a pulse signal generator, coupled to the hysteresis voltage comparator and the third switch, for detecting rising edges and falling edges of the comparison signal and generating the pulse signal at a predetermined time,
wherein the logical operation unit comprises:
a first OR gate, having a first input terminal for receiving the control signal, a second input terminal for receiving the comparison signal, and an output terminal for outputting the first switching signal;
a NOT gate, having an input terminal coupled to the second input terminal of the first OR gate; and
a second OR gate, having a first input terminal coupled to an output terminal of the NOT gate, a second input terminal for receiving the control signal, and an output terminal for outputting the second switching signal.

17. The projection device according to claim 16, wherein the first switch is a first transistor, a gate of the first transistor is coupled to the output terminal of the first OR gate, a source of the first transistor is coupled to the anode of the first diode for receiving the first power, and a drain of the first transistor outputs the first power.

18. The projection device according to claim 17, wherein the second switch is a second transistor, a gate of the second transistor is coupled to the output terminal of the second OR gate, a source of the second transistor is coupled to the anode of the second diode for receiving the second power, and a drain of the second transistor is coupled to the drain of the first transistor for outputting the second power.

19. The projection device according to claim 18, wherein the third switch is a third transistor, a gate of the third transistor is coupled to the pulse signal generator for receiving the pulse signal, a source of the third transistor is coupled to the cathode of the first diode and the cathode of the second diode, and a drain of the third transistor is coupled to the drain of the first transistor and the drain of the second transistor for outputting one of the first power and the second power.

20. The projection device according to claim 19, wherein the first transistor, the second transistor, and the third transistor are P-type field effect transistors.

21. The projection device according to claim 19, wherein the first transistor, the second transistor, and the third transistor are N-type field effect transistors.

22. The projection device according to claim 16 further comprising:
a DC/DC converter, coupled to the power switching device, for receiving and converting the output voltage into a plurality of DC voltages as operating voltages of internal related components of the projection device.

23. The projection device according to claim 16 further comprising:

a power adapter, coupled to the interface, for supplying the second power.

24. The projection device according to claim 23, wherein the interface is a DC power jack.

* * * * *